April 25, 1933.  H. E. CORBITT  1,905,629
APPARATUS FOR PRODUCING RECTIFIED HIGH VOLTAGE ELECTRIC CURRENT
Filed Feb. 3, 1930   2 Sheets-Sheet 1
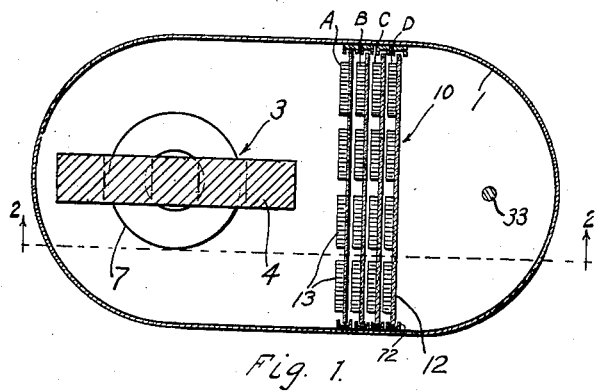
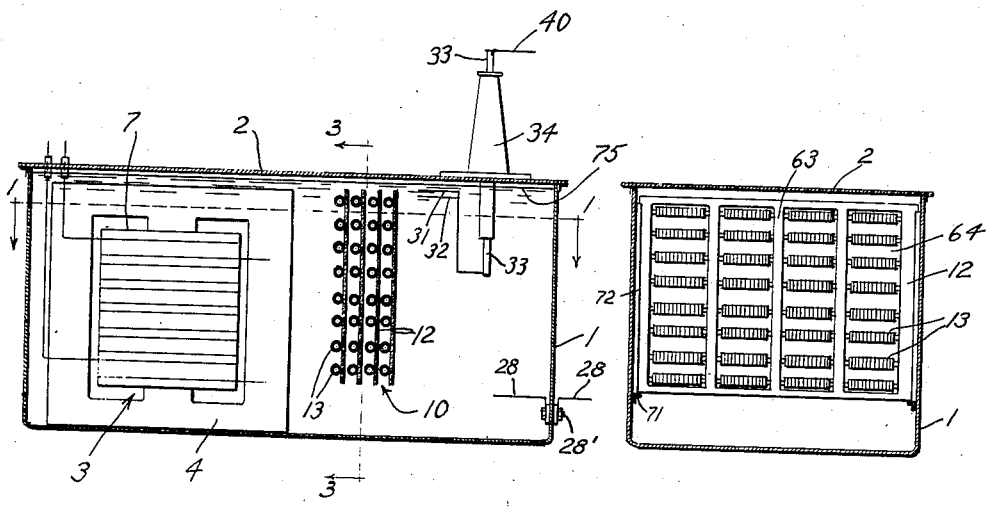
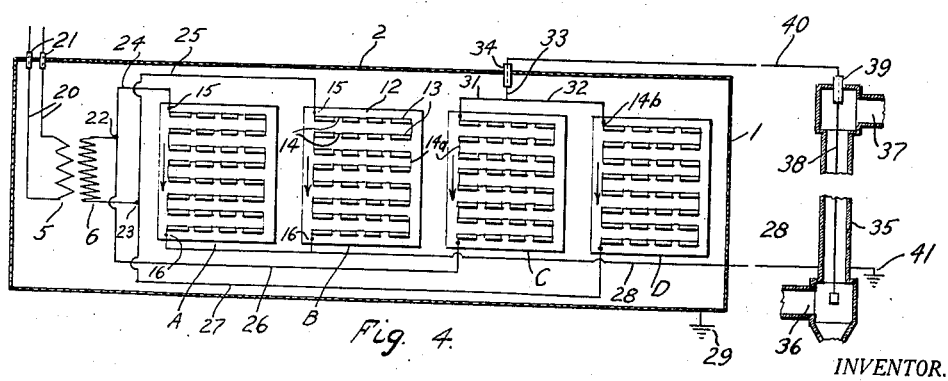
INVENTOR.
Howard E. Corbitt.
BY
ATTORNEYS.

April 25, 1933.  H. E. CORBITT  1,905,629
APPARATUS FOR PRODUCING RECTIFIED HIGH VOLTAGE ELECTRIC CURRENT
Filed Feb. 3, 1930.  2 Sheets-Sheet 2
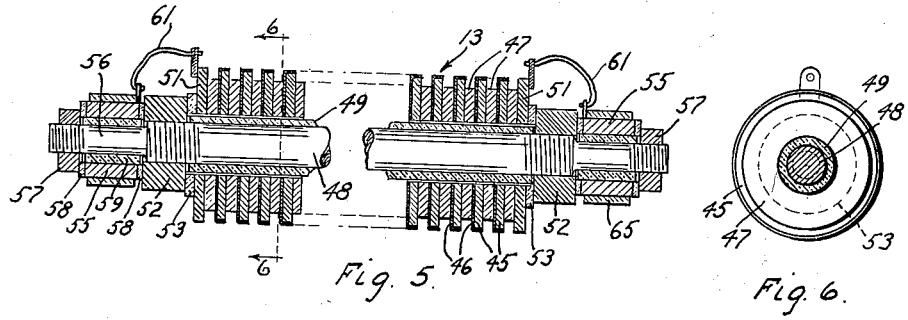
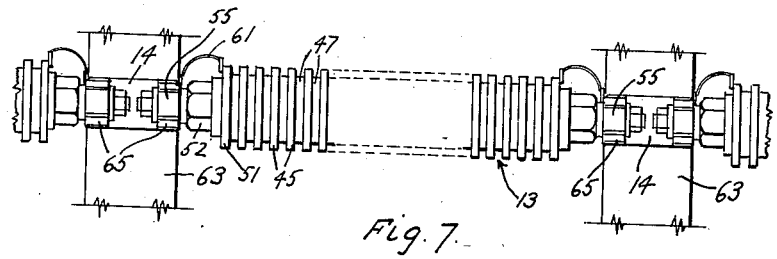
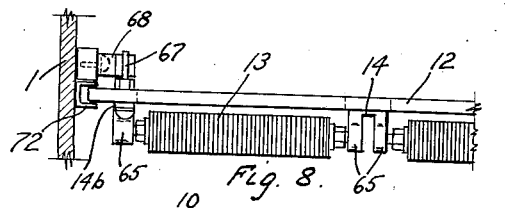
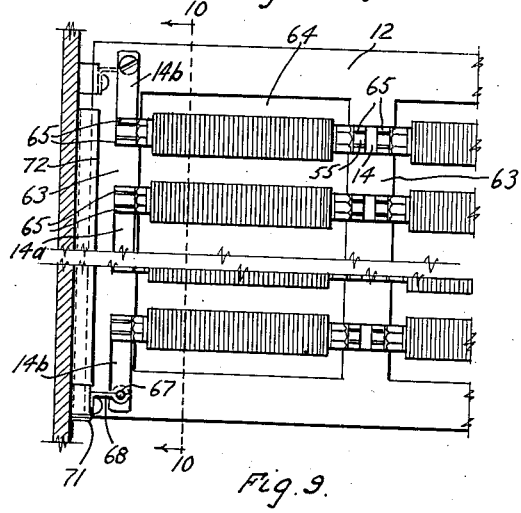
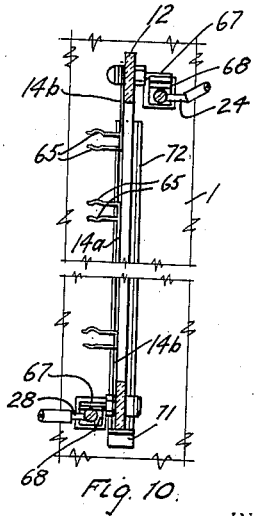
INVENTOR.
Howard E. Corbitt
BY Arthur P. Knight and
Alfred W. Knight
ATTORNEYS Patented Apr. 25, 1933

1,905,629

UNITED STATES PATENT OFFICE

HOWARD E. CORBITT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA

APPARATUS FOR PRODUCING RECTIFIED HIGH VOLTAGE ELECTRIC CURRENT

Application filed February 3, 1930. Serial No. 425,680.

This invention relates to the production of rectified high voltage current from alternating current at relatively low voltage. While the apparatus is intended particularly for use in obtaining a supply of unidirectional current at high voltage for energization of electrical precipitation apparatus or other apparatus employing a unidirectional high potential electric field, it will be understood that it may also be used for other purposes where a current of such characteristic is required.

The principal object of the invention is to provide an apparatus for this purpose which is economical in manufacture and operation, and is also of rugged construction and free from moving parts, and which is adapted to produce unidirectional current of a frequency corresponding to the frequency of the input current and without causing production of high frequency surges or oscillations in the output circuit.

In respect to the last mentioned advantage of this invention, the same is particularly evident by comparison with the so-called mechanical rectifying apparatus in which rectification is obtained by alternately making and breaking the connections between the two sides of the output circuit and the two sides of the input circuit in synchronism with the reversals in electro-motive force in the input circuit. The repeated making and breaking of the electric circuit in such mechanical rectifying apparatus leads to the production of high frequency surges or oscillations in the output circuit due to sparking between the contacts during such making and breaking, and it is believed that such high frequency disturbances are disadvantageous in the operation of electrical precipitation apparatus since they increase the tendency to arcing or disruptive discharge between the opposing electrodes of such apparatus. It is, therefore, a particular object of this invention to provide a rectifying apparatus in which there is no repeated mechanical making and breaking of the electric circuit.

A further object of the invention is to provide an apparatus contained within a single housing and comprising transforming means adapted to step the voltage up to the desired value and rectifying means connected to the secondary winding of said transforming means and adapted to rectify such high voltage current. A particular object in this connection is to provide an apparatus of this type in which one side of the output of the rectifying means is electrically connected to the housing of the apparatus and grounded, while the other side of the output of such rectifying means is connected to a conductor which extends out through suitable high voltage insulating means on the wall of the housing. This high tension conductor may then be connected to the high tension electrodes of an electrical precipitation apparatus or the like, so that by grounding the low tension electrodes thereof and preferably also connecting said low tension electrodes directly to the housing of the transforming and rectifying means, the circuit of the precipitation apparatus is completed. An advantage of this arrangement is that only one high tension conductor needs to be brought out through the wall of the housing of the transforming and rectifying means and only a single high voltage insulating bushing is therefore required. This is to be distinguished from the provision of a separate transforming apparatus and a separate rectifying apparatus, in which case both output terminals of the transforming apparatus must be maintained at high potential difference with respect to the ground and the conductors leading therefrom must, therefore, be brought out through separate high voltage insulating bushings in the housing of such transforming apparatus. It is to be noted that suitable conductors must also extend in through the housing of the apparatus, for connection to the primary winding of the transformer, but since the priming voltage is relatively low, the insulation of these conductors from the housing is a comparatively simple matter.

The apparatus of my invention comprises essentially a housing, an electrical transformer mounted within said housing, and rectifying means of the asymmetrically conductive solid contact type also mounted within said housing and insulated therefrom. The apparatus also preferably comprises electrical conductors connected to the primary winding of said transformer and extending out through and insulated from said housing, for connection to a suitable source of relatively low voltage electric current, conducting means electrically connecting the primary winding of said transformer to said rectifying means, preferably in such manner as to provide for full wave rectification thereby, means electrically connecting one of the output terminals of said rectifying means to the wall of said housing so as to provide for grounding thereof, and an electrical conductor connected to the other output terminal of said rectifying means and extending out through the wall of said housing and insulated therefrom by suitable high voltage insulating means.

The rectifying means of the above mentioned type consists in general of a plurality of rectifying elements connected in series, each of said elements comprising two substantially solid substances in intimate contact with one another and of such a nature as to permit electric current flow in substantially only one direction across the interface between said substances. One of such substances may consist, for example, of a plate or member of copper, in which case the other of such substances may consist of a film or layer of copper oxide formed on one face of said copper member. In the case of these two substances the resistance to flow of electric current from the copper to the copper oxide is much greater than the resistance to flow from the oxide to the copper, so that if a number of such elements are connected in series between two terminals subjected to an alternating electric potential, an electric current will be permitted to flow relatively freely when the electric potential is in such direction as to cause current flow from the copper oxide to the copper in each element, but will be substantially interrupted or prevented from flowing when the electric potential is in the reverse direction. It will be understood, of course, that the invention is not restricted to the use of copper and copper oxide as the substances constituting the rectifying elements, but that any other substances exhibiting this type of rectifying action may also be employed.

The voltage which may be impressed across one rectifying element of the above described type is relatively small, so that for the rectification of high voltage electric current it becomes necessary to connect a considerable number of such elements in series, and I prefer to accomplish this by providing rectifying units each comprising a plurality of rectifying elements and being of a convenient size for manufacture and handling, and to mount and electrically interconnect a sufficient number of such rectifying units to provide for rectification of the desired output voltage. My invention therefore also comprises novel and advantageous means for mounting and electrically inter-connecting the rectifying means and for supporting the same within the housing and insulating the same therefrom.

The resistance to current flow offered by rectifying means of the above type causes the production of considerable heat during operation thereof and it is, therefore, necessary to provide for dissipation of such heat at a sufficient rate to prevent overheating of the rectifying elements, for it has been found that heating of such elements beyond a certain temperature not only reduces the rectifying efficiency thereof but is also apt to permanently destroy the rectifying power thereof. A further object of the invention, therefore, in connection with the mounting of a transformer and of rectifying means of the above type within a single housing, is to provide a common cooling medium for both of said means, so that the same medium serves to prevent overheating of both the transforming and rectifying means.

The accompanying drawings illustrate apparatus in accordance with my invention and referring thereto:

Fig. 1 is a horizontal section of a complete transforming and rectifying apparatus taken on line 1—1 in Fig. 2.

Fig. 2 is a vertical section on line 2—2 in Fig. 1.

Fig. 3 is a transverse vertical section on line 3—3 in Fig. 2.

Fig. 4 is a wiring diagram showing the connections between the transforming and rectifying means and also showing the connections of the output of said rectifying means to an electrical precipitating apparatus.

Fig. 5 is a longitudinal section of one rectifying unit of a form which may advantageously be used in building up the complete rectifying means.

Fig. 6 is a transverse section of such apparatus on line 6—6 in Fig. 5.

Fig. 7 is a side elevation showing the means of mounting and interconnecting such rectifying units.

Fig. 8 is a partial plan view of a supporting panel on which a plurality of such rectifying units are mounted.

Fig. 9 is a side elevation of the parts shown in Fig. 8.

Fig. 10 is a vertical section on line 10—10 in Fig. 9, with the rectifying units removed.

In Figs. 1 to 4 of the drawings, the housing formed preferably of steel or other suitable metal is indicated at 1, said housing preferably including a removable cover plate 2 so that when the cover is in place the interior of said housing is entirely enclosed. Within said housing, for example, adjacent one end thereof, is mounted a suitable step-up transformer 3 comprising an iron core 4 of any suitable construction and configuration, and primary and secondary windings 5 and 6 respectively. The coils comprising said primary and second windings are indicated in general at 7 in Figs. 1 and 2, without any attempt to indicate the relative positions of the respective windings upon the core, as this is well known practice and forms no part of the present invention. Rectifying means of the asymmetrically conductive solid contact type are also mounted within said housing, for example, at one side of the transformer, as shown at 10, said rectifying means comprises a multiplicity of rectifying elements of the type above described, a sufficient number of said elements being connected in series to take care of the voltage which must be handled.

In order to provide for full wave rectification and for delivering to the load substantially the full output voltage of the transformer secondary winding, the rectifying elements are preferably arranged in four groups connected in the conventional manner for full wave rectification, between the terminals of the transformer secondary and the two sides of the load. An advantageous construction, therefore, comprises four separately assembled groups of rectifying elements indicated at A, B, C and D respectively, and all of the rectifying elements of each group may advantageously be mounted on a suitable insulating supporting member or panel such as indicated at 12. Each group of rectifying elements preferably comprises a plurality of rectifier units 13 mounted on the supporting member 12, each of said rectifier units comprising in turn a plurality of rectifying elements connected together and mounted in any suitable manner. All of the rectifier units of any one group are connected in series as by connections indicated at 14 and are all mounted for passage of electric current substantially only in one direction through the entire series of elements in that group. For example, in Fig. 4 the rectifier units of each group are shown as mounted so as to permit flow of electric current from the upper terminal 15 of each of said groups to the lower terminal 16 thereof, as indicated by the arrows applied thereto. An advantageous construction of the rectifier units 13 and an advantageous means of mounting said units on the supporting members 12 will be described hereinafter.

The apparatus further comprises electrical conductors 20 connected to the primary winding 5 of the transformer and extending through suitable insulating bushings 21 in the housing 1, for example in cover plate 2 thereof, to a point outside the housing for connection to a suitable source of low voltage alternating current power supply. The respective terminals 22 and 23 of the transformer secondary winding are connected by wires 24 and 25 respectively to the upper terminals 15 of the two rectifier groups A and B and by wires 26 and 27 respectively to the lower terminals 16 of the rectifier groups C and D. The lower terminals 16 of the rectifier groups A and B are electrically grounded, this being preferably accomplished by connecting said terminals to the metallic housing 1 as, for example, by conductor 28, and grounding said housing as indicated at 29. The upper terminals 15 of the rectifier groups C and D are connected as by wires 31 and 32 to a conductor such as rod 33 extending through high tension insulating bushing 34 on the housing 1, for example, on cover plate 2. The electric circuit through the load may then be completed by connecting one side of said load to the conductor 33 and by electrically grounding the other side of the load and preferably also connecting the same to the metallic housing 1.

In Fig. 4 I have indicated diagrammatically the connection of the above described apparatus to an electrical precipitation apparatus constituting a load. Such precipitation apparatus is shown as comprising collecting electrode means indicated diagrammatically as a tube or pipe 35, inlet and outlet means 36 and 37 for effecting passage of gas to be cleaned through said tube or pipe, and discharge electrode means indicated as comprising a wire or fine rod 38 extending centrally within the tube or pipe 35. Said discharge electrode means is insulated from the collecting electrode means in any suitable manner as by means of insulating bushing 39 and is shown as connected by wire 40 to the high tension output conductor 33 of the apparatus above described. The collecting electrode means is grounded as indicated at 41 and is also preferably directly connected to the grounded conductor 28 as shown. Said conductor 28 therefore extends through the housing 1, but need not be insulated therefrom as it is at all times at the same electric potential as the ground. Said conductor may be carried through said housing, for example by means of a bolt 28' extending through the wall thereof, as shown in Fig. 2.

A simple form of construction of the rectifier units 13 is illustrated in Figs. 5 to 7 inclusive, although it will be understood that this particular construction forms no essential part of the present invention and any other suitable form of rectifier unit of the above described type may be used in place of that shown in these figures. Each of said units is shown as comprising a plurality of copper plates or discs 45 each of which has a thin coating or film 46 of copper oxide upon one face thereof while the other face is free from such coating. In order to provide more effective electrical contact with the oxidized face of such plates, washers or plates 47 of some relatively soft metal such as lead are interposed between the copper plates. Any suitable number of such elements may be assembled in the form of a stack in each rectifier unit, so as to form a unit of convenient size for mounting. All of said elements may be mounted upon a supporting member extending centrally through, such as bolt 48 provided with an insulating sleeve 49 to prevent short circuiting between the elements of the unit. At each end of the stack is provided a terminal plate 51 in contact with the adjacent rectifying element, and the entire stack may be secured in position on bolt 48 and compressed tightly so as to cause intimate contact between all of the members 45, 46 and 47, as well as the terminal plates 51, by means of nuts 52 screwing on the opposite ends of said bottom. Insulating washers 53 are provided between said nuts and the terminal plates 51. In order to provide a convenient means for making electrical contact between the adjacent rectifier units, each unit is shown as provided with a metal contact sleeve 55 at each end, said contact sleeves being secured for example on reduced extensions 56 of bolt 48, by means of nuts 57 and being insulated by means of insulating washers 58 and insulating sleeves 59. Each of said contact sleeves may be electrically connected to the adjacent terminal plate 51 in any suitable manner, for example, by means of wires or conductors 61 soldered or otherwise secured to said contact sleeves and terminal plates, as shown.

The supporting panels on which the rectifier units are mounted are shown as comprising frames or panels 12 of insulating material. Each of said panels or frames is shown as mounted in a vertical plane and provided with vertical strips 63 having openings 64 therebetween, the width of said openings corresponding substantially to the length of the individual rectifier units 13, so as to permit free circulation of cooling medium around said units. The connecting members 14 for connecting together the rectifier units of each group are shown as comprising metal brackets secured to the vertical strips 33 and each provided with two resilient contact sockets 65 at the respective ends thereof adapted to receive and make electric contact with the contact sleeves 55 at the ends of said units but to permit bodily removal of such units therefrom due to the resilience of the arms of said sockets, as shown particularly in Fig. 10. Suitable brackets 14a, also provided with resilient contact sockets 65 may be provided for establishing connection between the end of each row of rectifier units and the adjacent end of the next row in the group. For making electrical connection to the opposite ends of the entire series of rectifier units of each group, brackets 14b may be provided, having resilient contact sockets 65 at one end for making contact with one end of the upper and lower rows of rectifier units respectively, and each connected to a contact stud 67 projecting from the panel in position to make electrical connection with contact clips 68 secured to the wall of the housing and insulated from said housing in any suitable manner. The contact studs 67 and 68 may be considered as jointly comprising the upper and lower terminals 15 and 16 of each group of rectifier units, as indicated in Fig. 4. It may be seen from Figs. 8 and 9 that each of said studs merely rests upon the corresponding clip 68 so that the whole panel may be readily removed from the housing. Upon being mounted in the position shown, electrical connection between said studs and clips is automatically established. In order to facilitate insertion and removal of the panels, the upper and lower contact studs 67 are shown as projecting from opposite sides of the panel. The panels 63 may be supported at their lower ends by means of supporting brackets 71 secured to the wall of the housing and said panels may be held in proper position by means of vertical guide channels 72 secured to the side walls of the housing and engaging the lateral edges of said panels. In the actual construction, the wires 24, 25, 26, 27, 28, 31 and 32 of Fig. 3 may be connected to the contact clips 68, as indicated, for example, by wires 24 and 28 in Fig. 10. In order to avoid confusion, however, the connections of these several wires, as well as the contact clips and studs themselves are omitted from Figs. 1 to 3 inclusive.

The interior of housing 1 may be filled with a suitable liquid cooling medium surrounding both the transformer 3 and the rectifier means 10, as indicated at 75 in Fig. 2. Such cooling medium may consist of an oil similar to that commonly employed as a cooling medium in transformers. An important advantage of this invention is that the transforming and rectifying means are both located within a single housing, and a single body of cooling medium serves to cool both of said means. The openings 64 in the supporting panels 12 serve to permit free circulation of the cooling medium around all the rectifying elements. A further advantage arising from this location of both the transforming and rectifying means within a single housing is that the connections from the secondary winding of the transformer to the rectifying means, which are at high potential difference with respect to one another or to the ground, are located wholly within said housing and do not need to be carried out of a transformer housing and to a separate rectifying apparatus as would otherwise be the case. As pointed out above, the connection from one side of the output of the rectifying means is directly connected to the ground, preferably through the housing, so that the only high tension conductor which need be provided extending out through the wall of the housing is the conductor leading from the other side of the output of the rectifying means to the high tension side of the load, namely, in the present instance the discharge electrode means 38 of the electrical precipitator. For this reason only a single high voltage insulating bushing is required for bringing this single high tension conductor through the wall of the housing.

The operation of the apparatus above described need be only briefly referred to. During one half cycle, when the terminal 22 of the transformer secondary winding is at a positive potential with respect to the other terminal, current will flow through wire 24, through the group of rectifier units A, and through the grounded conductor 28 to the collecting electrode means 35, and from the discharge electrode means 38 through conductors 40 and 33, wire 31, rectifying group D and conductor 27 back to the other terminal 23. During the next half cycle the terminal 23 will be at a positive potential and current will then flow through a corresponding circuit including rectifier groups B and C. The discharge electrode means will thus be maintained at all times at a negative potential with respect to the collecting electrode means so as to maintain an electric discharge between said electrode means. It will be noted, furthermore, that the electric circuit is not mechanically closed or mechanically interrupted at any time, and there is always a completed path for flow of electric current through one or the other of the pairs of rectifier groups. The flow of electric current, and hence the electric potential between the electrode means of the precipitator will, therefore, smoothly increase from zero to its maximum value and then smoothly decrease to zero again, without the introduction of high frequency surges or oscillations, due to sudden or sharp changes in current flow or voltage, such as occur in the operation of mechanical rectifying means. This smoothness in the fluctuations of the electric current and voltage at the precipitator is a further and advantageous feature obtained by the use of rectifying means of the above described type.

I claim:

1. In an apparatus for producing rectified high voltage electric current, a housing, a plurality of insulating supporting panels removably mounted within said housing, a plurality of asymmetrically conductive solid contact rectifier units mounted on each of said supporting panels, means electrically connecting said rectifier units in series, and a body of liquid cooling medium within said housing and surrounding all of said rectifier units, said supporting panels being provided with openings adjacent said rectifier units so as to permit free circulation of said cooling medium through said openings and around said units.

2. An electric current rectifying apparatus comprising a supporting panel of insulating material, a plurality of connecting members mounted on said panel and each provided with two socket means electrically connected together through said connecting means, and a plurality of asymmetrically conductive solid contact rectifier units each provided with contact members at the opposite ends thereof removably inserted in one of the socket means of two adjacent connecting members, whereby all of said rectifier units are connected in series and any one of said units is separately removable from said panel, said rectifier units extending parallel to said panel and in close proximity thereto, and said panel being provided with openings adjacent said rectifier units so as to permit free circulation of a fluid cooling medium through said openings and around said units.

3. In an apparatus for producing rectified high voltage electric current, a housing, a plurality of insulating supporting panels removably mounted within said housing, a plurality of asymmetrically conductive solid contact rectifier units mounted on each of said supporting panels, means electrically connecting all of said rectifier units on each individual panel in series with one another, contact members mounted on each of said panels electrically connected to opposite ends of the series of elements for that panel, a plurality of contact members disposed on said casing and insulated from one another in position for engagement by the contact members on the respective panels upon insertion of said panels to position within said housing, and electric conductors connected to said contact members on the casing for connection of said rectifier units in an electric circuit.

In testimony whereof I have hereunto subscribed my name this 21st day of January 1930.

HOWARD E. CORBITT.